US011897577B2

(12) United States Patent
Tokito et al.

(10) Patent No.: US 11,897,577 B2
(45) Date of Patent: Feb. 13, 2024

(54) SADDLE-RIDING TYPE VEHICLE

(71) Applicant: HONDA MOTOR CO., LTD., Tokyo (JP)

(72) Inventors: Akira Tokito, Wako (JP); Kuniaki Wakamatsu, Wako (JP); Eisuke Kajihara, Wako (JP); Junya Ono, Wako (JP); Go Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 17/433,245

(22) PCT Filed: Nov. 19, 2019

(86) PCT No.: PCT/JP2019/045231
§ 371 (c)(1),
(2) Date: Aug. 24, 2021

(87) PCT Pub. No.: WO2020/179142
PCT Pub. Date: Sep. 10, 2020

(65) Prior Publication Data
US 2022/0135181 A1  May 5, 2022

(30) Foreign Application Priority Data

Mar. 4, 2019  (JP) .................. 2019-038539

(51) Int. Cl.
*B62M 25/08* (2006.01)
*F16D 25/08* (2006.01)
*B62J 23/00* (2006.01)

(52) U.S. Cl.
CPC ............. *B62M 25/08* (2013.01); *F16D 25/08* (2013.01); *B62J 23/00* (2013.01)

(58) Field of Classification Search
CPC .......... B62J 45/42; F16D 25/08; F16D 48/02; B62M 25/08
See application file for complete search history.

(56) References Cited

U.S. PATENT DOCUMENTS

2018/0087543 A1 * 3/2018 Kajihara .................. F15B 1/04
2018/0274607 A1   9/2018 Ono et al.

FOREIGN PATENT DOCUMENTS

EP    2366918 A1 * 9/2011 ............. F16H 63/14
JP    2011-075030    4/2011
(Continued)

OTHER PUBLICATIONS

International Search Report and Written Opinion for International Application No. PCT/JP2019/045231 dated Jan. 21, 2020, 8 pages.

*Primary Examiner* — Abiy Teka
(74) *Attorney, Agent, or Firm* — Amin, Turocy & Watson, LLP

(57) ABSTRACT

This saddle-riding type vehicle includes: a transmission that includes a clutch operated by an operation of a slave cylinder; an oil pressure actuator that includes a master cylinder which generates an oil pressure on an operation oil; an oil pressure valve unit that controls transmission of the oil pressure generated by the master cylinder to the slave cylinder; a master-side connection pipe arrangement that connects the master cylinder to the oil pressure valve unit; and a slave-side connection pipe arrangement that connects the oil pressure valve unit to the slave cylinder, wherein the slave cylinder and the oil pressure valve unit are arranged on one side part in a vehicle width direction of the saddle-riding type vehicle, and the oil pressure actuator is arranged on another side part in the vehicle width direction of the saddle-riding type vehicle.

10 Claims, 12 Drawing Sheets

(56) References Cited

FOREIGN PATENT DOCUMENTS

| | | |
|---|---|---|
| JP | 2018-162794 | 10/2018 |
| WO | 2018/221463 | 12/2018 |

* cited by examiner

SADDLE-RIDING TYPE VEHICLE

TECHNICAL FIELD

The present invention relates to a saddle-riding type vehicle.

Priority is claimed on Japanese Patent Application No. 2019-038539, filed on Mar. 4, 2019, the contents of which are incorporated herein by reference.

BACKGROUND

In the related art, a saddle-riding type vehicle is known which employs a so-called semi-automatic transmission system (automatic clutch type transmission system) in which a transmission operation of a transmission is performed by a driver, and a connection/disconnection operation of the clutch of the transmission is automatically performed. For example, the transmission system of Patent Document 1 includes an oil pressure generator that generates an oil pressure (hydraulic pressure) on an operation oil, a slave cylinder that connects and disconnects a clutch by the oil pressure generated by the oil pressure generator, and an oil pressure control device that controls the oil pressure transmitted from the oil pressure generator to the slave cylinder.

RELATED ART DOCUMENTS

Patent Documents

Patent Document 1

Japanese Unexamined Patent Application, First Publication No. 2011-75030

SUMMARY OF INVENTION

Problems to be Solved by the Invention

In the related art described above, it is desirable to drive the slave cylinder with good response in a case where a driver performs the transmission operation of the transmission or in a case where a control of the oil pressure is performed by the oil pressure control device.

Accordingly, the present invention is intended to enhance the operation responsiveness of an oil pressure control of a clutch.

Means for Solving the Problem

As a means for solving the problem described above, an aspect of the present invention has the following configurations.

A saddle-riding type vehicle according to a first aspect of the present invention includes: a transmission (21) that includes a clutch (26) operated by an operation of a slave cylinder (28); an oil pressure actuator (51) that includes a master cylinder (60) which generates an oil pressure on an operation oil; an oil pressure valve unit (53) that controls transmission of the oil pressure generated by the master cylinder (60) to the slave cylinder (28); a master-side connection pipe arrangement (91) that connects the master cylinder (60) to the oil pressure valve unit (53); and a slave-side connection pipe arrangement (92) that connects the oil pressure valve unit (53) to the slave cylinder (28), wherein the slave cylinder (28) and the oil pressure valve unit (53) are arranged on one side part in a vehicle width direction of the saddle-riding type vehicle (1), and the oil pressure actuator (51) is arranged on another side part in the vehicle width direction of the saddle-riding type vehicle (1).

A second aspect is the saddle-riding type vehicle according to the first aspect described above, wherein the clutch (26) may be arranged on the other side part in the vehicle width direction.

A third aspect is the saddle-riding type vehicle according to the first or second aspect which may further include a cowl member (121L, 121R) that covers at least part of the oil pressure actuator (51) and the oil pressure valve unit (53) from the outside.

A fourth aspect is the saddle-riding type vehicle according to any one of the first to third aspects, wherein the oil pressure actuator (51) and the oil pressure valve unit (53) may be arranged within a bank range (B1) of the saddle-riding type vehicle (1).

A fifth aspect is the saddle-riding type vehicle according to any one of the first to fourth aspects which may further include an engine (13) arranged in front of the transmission (21), wherein the engine (13) may include a cylinder (16) that stands upward, and the oil pressure actuator (51) and the oil pressure valve unit (53) may be arranged in front of and below the engine (13).

A sixth aspect is the saddle-riding type vehicle according to the fifth aspect which may further include a discharge pipe (131 to 134) that is connected to a front part of the cylinder (16), wherein at least part of the oil pressure actuator (51) and the oil pressure valve unit (53) may be covered by the discharge pipe (131 to 134) from a front direction.

A seventh aspect is the saddle-riding type vehicle according to the fifth or sixth aspect, wherein the oil pressure actuator (51) may further include a motor (70) for driving the master cylinder (60), wherein the master cylinder (60) and the motor (70) may be arranged such that a longitudinal direction is directed in a vertical direction and may be arranged to be inclined such that an upper end part is located at an outer position in the vehicle width direction, and a lower end part is located at an inner position in the vehicle width direction.

An eighth aspect is the saddle-riding type vehicle according to any one of the fifth to seventh aspects, wherein the oil pressure valve unit (53) may include an oil pressure sensor (57, 58) arranged such that a longitudinal direction is directed in a vertical direction and arranged to be inclined such that an upper end part is located at an outer position in the vehicle width direction, and a lower end part is located at an inner position in the vehicle width direction.

Advantage of the Invention

According to the saddle-riding type vehicle of the first aspect of the present invention, the slave cylinder and the oil pressure valve unit are arranged on one side part in the vehicle width direction of the saddle-riding type vehicle, the oil pressure actuator is arranged on another side part in the vehicle width direction of the saddle-riding type vehicle, and thereby, the following advantage is achieved.

Since the slave cylinder and the oil pressure valve unit are arranged on the same side part in the width direction, it is possible to cause the slave cylinder and the oil pressure valve unit to be closer to each other. Thereby, it is possible to shorten the slave-side connection pipe arrangement, and the oil pressure that is controlled by the oil pressure valve unit can be quickly transmitted to the slave cylinder. Accordingly, it is possible to enhance the operation responsiveness of the oil pressure control of the clutch. Additionally, by separating the oil pressure actuator from the oil pressure valve unit, it is possible to enhance the degree of arrangement freedom of the oil pressure actuator and the oil pressure valve unit. Additionally, since the oil pressure actuator and the oil pressure valve unit are distributed to both side parts in the vehicle width direction, it is possible to favorably maintain the weight balance of the vehicle.

According to the saddle-riding type vehicle of the second aspect of the present invention, the clutch is arranged on the other side part in the vehicle width direction, and thereby, the following advantage is achieved.

Since the clutch and the slave cylinder are distributed to both side parts in the vehicle width direction, it is possible to prevent the transmission from projecting to only one side in the vehicle width direction.

According to the saddle-riding type vehicle of the third aspect of the present invention, by further including the cowl member that covers at least part of the oil pressure actuator and the oil pressure valve unit from the outside, the following advantage is achieved.

It is possible to protect at least part of the oil pressure actuator and the oil pressure valve unit from a disturbance such as a flying rock by the cowl member.

According to the saddle-riding type vehicle of the fourth aspect of the present invention, the oil pressure actuator and the oil pressure valve unit are arranged within the bank range of the saddle-riding type vehicle, and thereby, the following advantage is achieved.

It is possible to prevent the bank angle of the saddle-riding type vehicle from being affected.

According to the saddle-riding type vehicle of the fifth aspect of the present invention, the engine arranged in front of the transmission is further provided, the engine includes the cylinder that stands upward, the oil pressure actuator and the oil pressure valve unit are arranged in front of and below the engine, and thereby, the following advantage is achieved.

In a case of an upright engine having a cylinder in which the engine stands upward, there is a space in front of and below the engine. Therefore, the oil pressure actuator and the oil pressure valve unit are arranged in a space in front of and below the engine, and thereby, it is possible to prevent the degree of arrangement freedom of another component from being impaired.

According to the saddle-riding type vehicle of the sixth aspect of the present invention, the discharge pipe that is connected to the front part of the cylinder is further provided, at least part of the oil pressure actuator and the oil pressure valve unit is covered by the discharge pipe from the front direction, and thereby, the following advantage is achieved.

It is possible to protect at least part of the oil pressure actuator and the oil pressure valve unit from a disturbance such as a flying rock by the discharge pipe.

According to the saddle-riding type vehicle of the seventh aspect of the present invention, the oil pressure actuator further includes the motor for driving the master cylinder, the master cylinder and the motor are arranged such that the longitudinal direction is directed in the vertical direction and are arranged to be inclined such that the upper end part is located at the outer position in the vehicle width direction, and the lower end part is located at the inner position in the vehicle width direction, and thereby, the following advantage is achieved.

It is possible to prevent the bank angle of the saddle-riding type vehicle from being affected.

According to the saddle-riding type vehicle of the eighth aspect of the present invention, the oil pressure valve unit includes the oil pressure sensor arranged such that the longitudinal direction is directed in the vertical direction and arranged to be inclined such that the upper end part is located at the outer position in the vehicle width direction, and the lower end part is located at the inner position in the vehicle width direction, and thereby, the following advantage is achieved.

It is possible to prevent the bank angle of the saddle-riding type vehicle from being affected.

DESCRIPTION OF THE EMBODIMENTS

Figure 1:
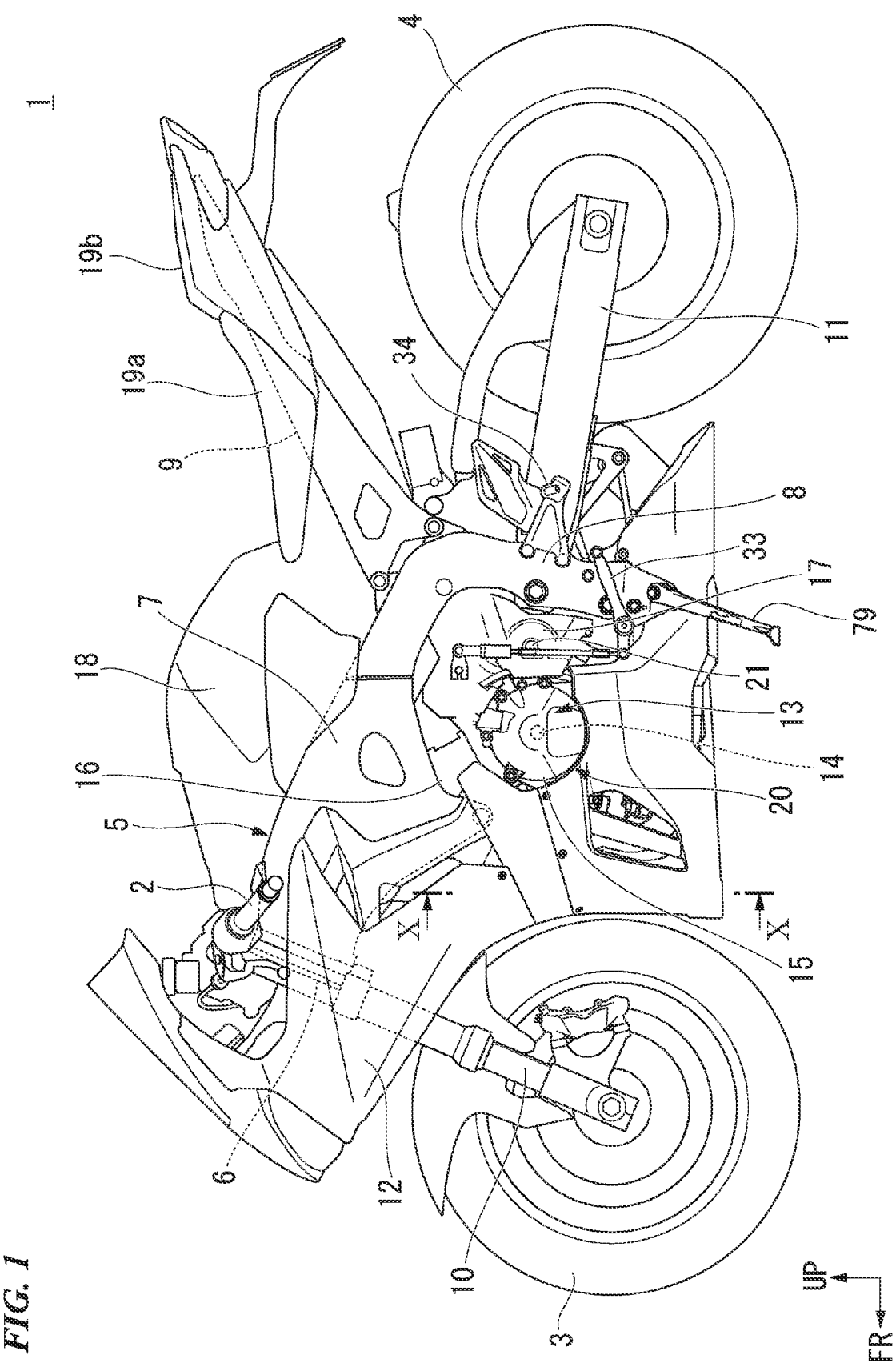
FIG. 1 is a left side view of a motorcycle of an embodiment.

Hereinafter, an embodiment of the present invention will be described with reference to the drawings. The orientations of the front, rear, left, right, and the like in the following description are the same as the orientations in the vehicle described below unless otherwise specified. Further, in appropriate positions in the drawing used in the following description, an arrow FR that indicates a vehicle frontward direction, an arrow LH that indicates a vehicle leftward direction, an arrow UP that indicates a vehicle upward direction, and a vehicle body left-to-right center line CL that indicates the center in the vehicle width direction of the vehicle are shown.

<Entire Vehicle>

FIG. 1 shows a motorcycle 1 as an example of a saddle-riding type vehicle. With reference to FIG. 1, the motorcycle 1 includes a front wheel 3 that is steered by a handle 2 and a rear wheel 4 that is driven by a power unit 20 which includes a power source. Hereinafter, the motorcycle may be simply referred to as a "vehicle".

The vehicle includes a steering system component that includes the handle 2 and the front wheel 3. The steering system component is steerably supported by a head pipe 6 at a front end part of a vehicle body frame 5. The outer circumference of the vehicle body frame 5 is covered by a vehicle body cover 12. In FIG. 1, a reference numeral 10 represents a front fork that supports the front wheel 3.

The vehicle body frame 5 includes: a head pipe 6 that steerably supports the front fork 10; a pair of left and right main frames 7 that extend rearward and downward from the head pipe 6; a pivot frame 8 that extends downward from a rear part of the main frame 7; and a pair of left and right seat rails 9 that extend rearward and upward from a rear upper part of the main frame 7.

A front end part of a swing arm 11 is swingably supported by the pivot frame 8 via a pivot shaft. The rear wheel 4 is rotatably supported by a rear end part of the swing arm 11.

A cushion unit (not shown) is provided between the swing arm 11 and the pivot frame 8.

A fuel tank 18 is supported by an upper part of the main frame 7. The vehicle includes a front seat 19a on which a driver is seated and a rear seat 19b on which a passenger is seated. The front seat 19a is arranged at a rear position of the fuel tank 18 and above the seat rail 9. The rear seat 19b is arranged at a rear position of the front seat 19a.

The vehicle includes a power unit 20 which is a motor. The power unit 20 is supported by the main frame 7 and the pivot frame 8. An output shaft of the power unit 20 is connected to the rear wheel 4 via a chain-type power transmission mechanism (not shown) such that power can be transmitted to the rear wheel 4.

The power unit 20 integrally includes an engine 13 (internal combustion engine) and a transmission 21 that is located on the rear side of the engine 13. For example, the engine 13 is a multi-cylinder engine in which a rotation axis of the crankshaft 14 is along the vehicle width direction. The engine 13 includes a crankcase 15 that accommodates the crankshaft 14 and a cylinder 16 that diagonally stands frontward and upward from a front upper part of the crankcase 15. A rear part of the crankcase 15 is a transmission case 17 that accommodates the transmission 21. Reference numeral 79 in the drawing represents a stand by which the vehicle can stand. The stand 79 is a tiltable side stand that supports the vehicle in a standing posture in which the vehicle is inclined to the left side.

<Transmission>

Figure 2:
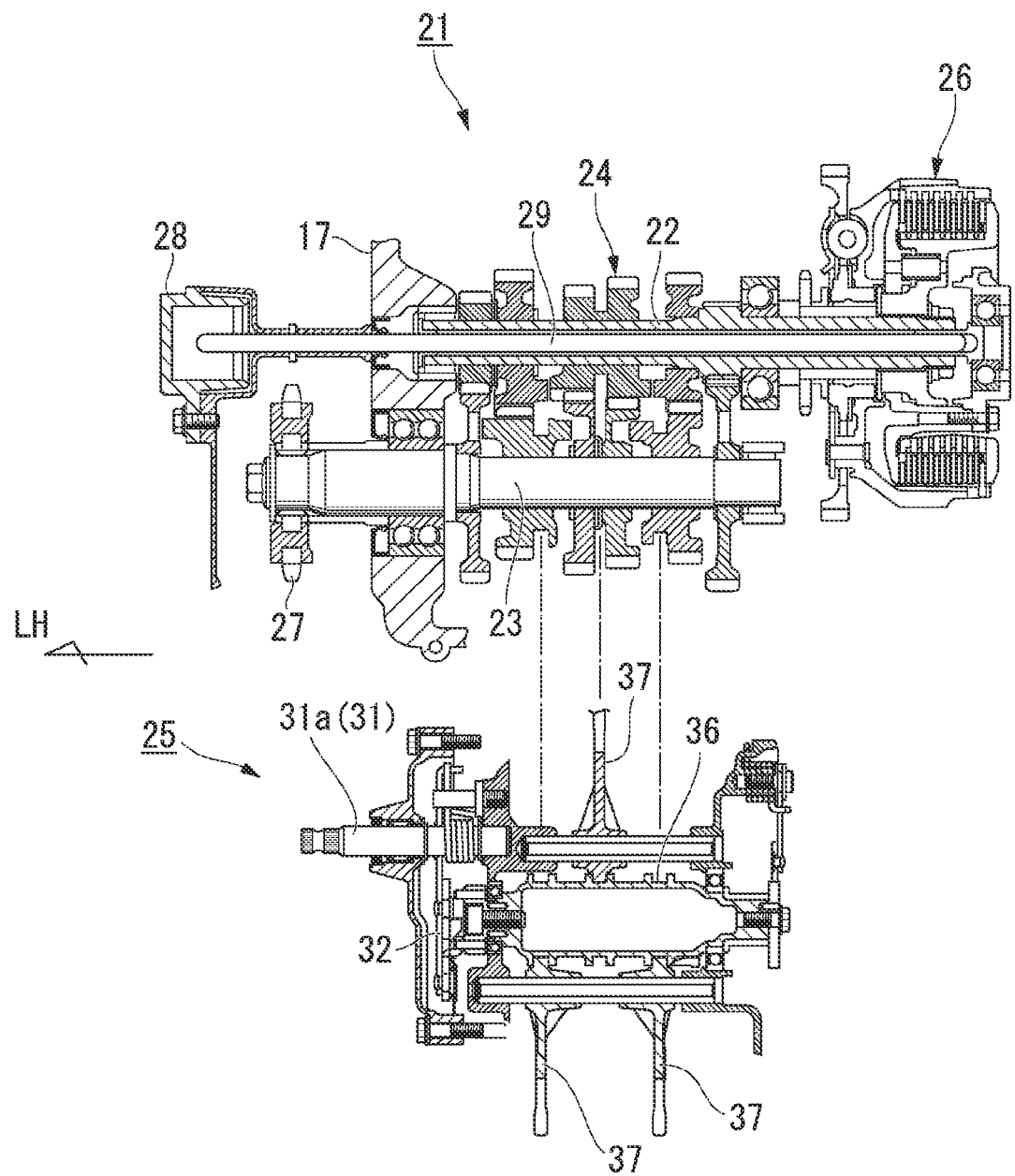
FIG. 2 is a cross-sectional view of a transmission and a change mechanism of the embodiment.

As shown in FIG. 2, the transmission 21 includes a main shaft 22 that extends in the vehicle width direction, a counter shaft 23 that is substantially parallel to the main shaft 22, and a transmission gear group 24 that spans the main shaft 22 and the counter shaft 23. The transmission 21 is a stage-type transmission. The counter shaft 23 constitutes an output shaft of the transmission 21 (power unit 20). An end part of the counter shaft 23 protrudes to a rear left side of the crankcase 15. A protrusion end part (left end part) of the counter shaft 23 is connected to the rear wheel 4 (refer to FIG. 1) via the chain-type power transmission mechanism.

The main shaft 22 and the counter shaft 23 are arranged behind the crankshaft 14 (refer to FIG. 1). The main shaft 22 and the counter shaft 23 are arranged to be aligned in a front-to-rear direction. A clutch 26 that is operated by a clutch actuator 50 (refer to FIG. 3) is provided on a right end part of the main shaft 22. The clutch 26 is arranged coaxially with the main shaft 22. For example, the clutch 26 is a wet-type multi-plate clutch.

The clutch 26 is a so-called normally open clutch that becomes a connection state in which power can be transmitted by an oil pressure supply from the clutch actuator 50 and returns to a disconnection state in which power cannot be transmitted when the oil pressure supply from the clutch actuator 50 stops.

A rotation power of the crankshaft 14 (refer to FIG. 1) is transmitted to the main shaft 22 via the clutch 26. The rotation power that is transmitted to the main shaft 22 is transmitted to the counter shaft 23 via an arbitrary gear pair of the transmission gear group 24.

In the drawing, reference numeral 27 represents a drive sprocket of the chain-type power transmission mechanism. The drive sprocket 27 is attached to a left end part of the counter shaft 23.

The transmission case 17 accommodates a change mechanism 25 that switches the gear pair of the transmission gear group 24. The change mechanism 25 includes: a shift drum 36 having a hollow cylindrical shape that is substantially parallel to each of the main shaft 22 and the counter shaft 23; a shift spindle 31 that is substantially parallel to the shift drum 36; a shift arm 32 (master arm) that is fixed to the shift spindle 31; and a plurality of shift forks 37.

A pattern of a lead groove is formed on an outer circumference of the shift drum 36. The change mechanism 25 rotates the shift drum 36 via the shift arm 32 by the rotation of the shift spindle 31. The change mechanism 25 moves the shift fork 37 in an axis direction in response to the pattern of the lead groove by the rotation of the shift drum 36. Thereby, a gear pair that can transmit power in the transmission gear group 24 is switched (that is, the transmission stage is switched).

The shift spindle 31 includes a shaft outer part 31a that protrudes outward (leftward) in the vehicle width direction of the crankcase 15 (refer to FIG. 1) in order to make the change mechanism 25 operable. A shift load sensor 42 (refer to FIG. 4) is coaxially attached to the shaft outer part 31a of the shift spindle 31. A shift pedal 33 (refer to FIG. 1) that is operated by the driver using his/her foot is attached to the shaft outer part 31a (or the rotation shaft of the shift load sensor 42) of the shift spindle 31 via a link rod (not shown).

As shown in FIG. 1, a front end part of the shift pedal 33 is supported by a lower part of the crankcase 15 via a shaft along the vehicle width direction. The shift pedal 33 is swingable upward and downward via the shaft along the vehicle width direction. A rear end part of the shift pedal 33 functions as a pedal part on which the toe of the driver's foot placed on a step 34 is placed.

The motorcycle 1 of the embodiment employs a so-called semi-automatic transmission system (automatic clutch-type transmission system) in which the driver performs only a transmission operation (a foot operation of the shift pedal 33) of the transmission 21, and a connection/disconnection operation of the clutch 26 is automatically performed by an electric control in response to the operation of the shift pedal 33.

<Transmission System>

Figure 4:
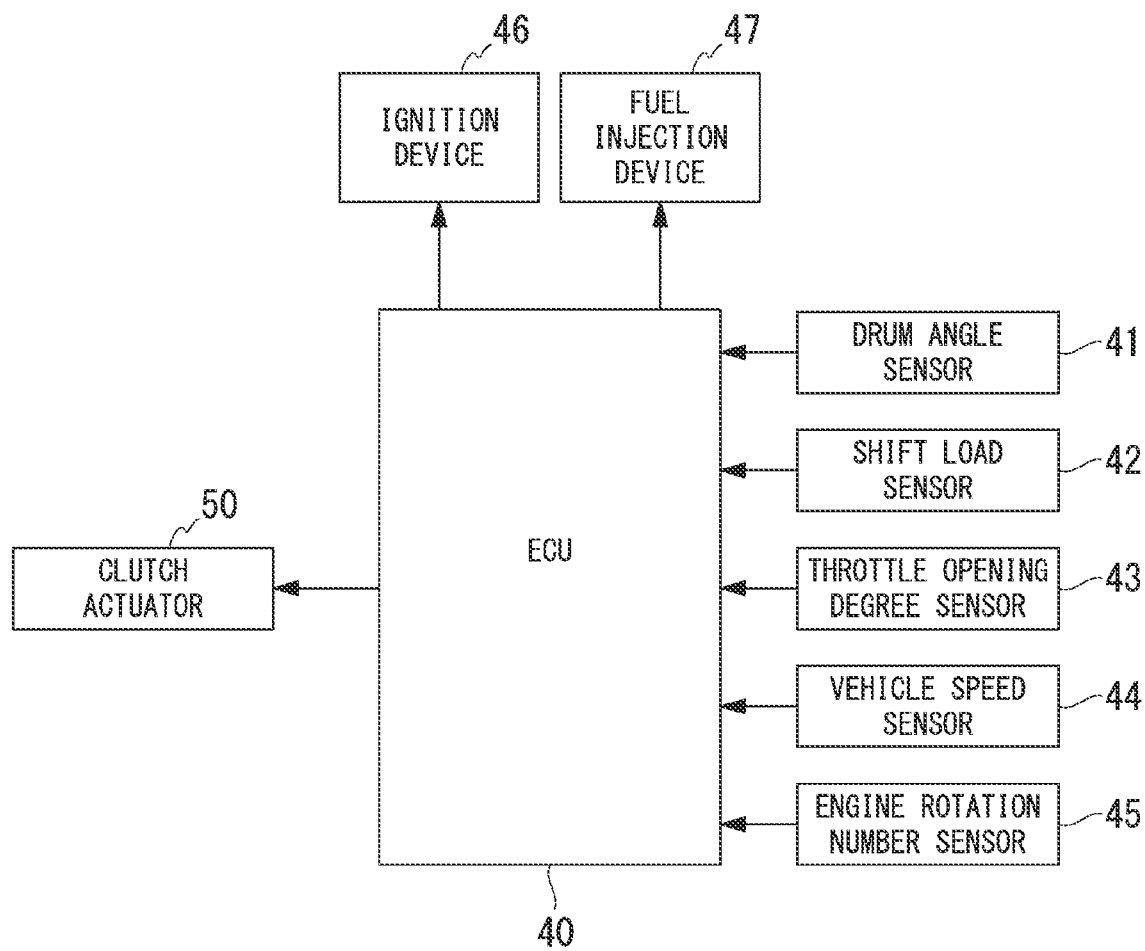
FIG. 4 is a block diagram of a transmission system of the embodiment.

As shown in FIG. 4, the transmission system includes the clutch actuator 50, an ECU 40 (Electronic Control Unit, a control part), and a variety of sensors 41 to 45. The variety of sensors 41 to 45 include: a drum angle sensor 41 (for example, a gear position sensor) that detects the transmission stage from a rotation angle of the shift drum 36; a shift load sensor 42 (for example, a torque sensor) that detects an operation torque input to the shift spindle 31; a throttle opening degree sensor 43; a vehicle speed sensor 44; and an engine rotation number sensor 45.

The ECU 40 controls the clutch actuator 50 and controls an ignition device 46 and a fuel injection device 47 on the basis of detection information from the gear position sensor 41 and the shift load sensor 42 and a variety of vehicle state detection information or the like from the throttle opening sensor 43, the vehicle speed sensor 44, the engine rotation number sensor 45, and the like.

Detection information from the pressure sensors 57 and 58 (refer to FIG. 3) of the clutch actuator 50 is also input to the ECU 40.

Figure 3:
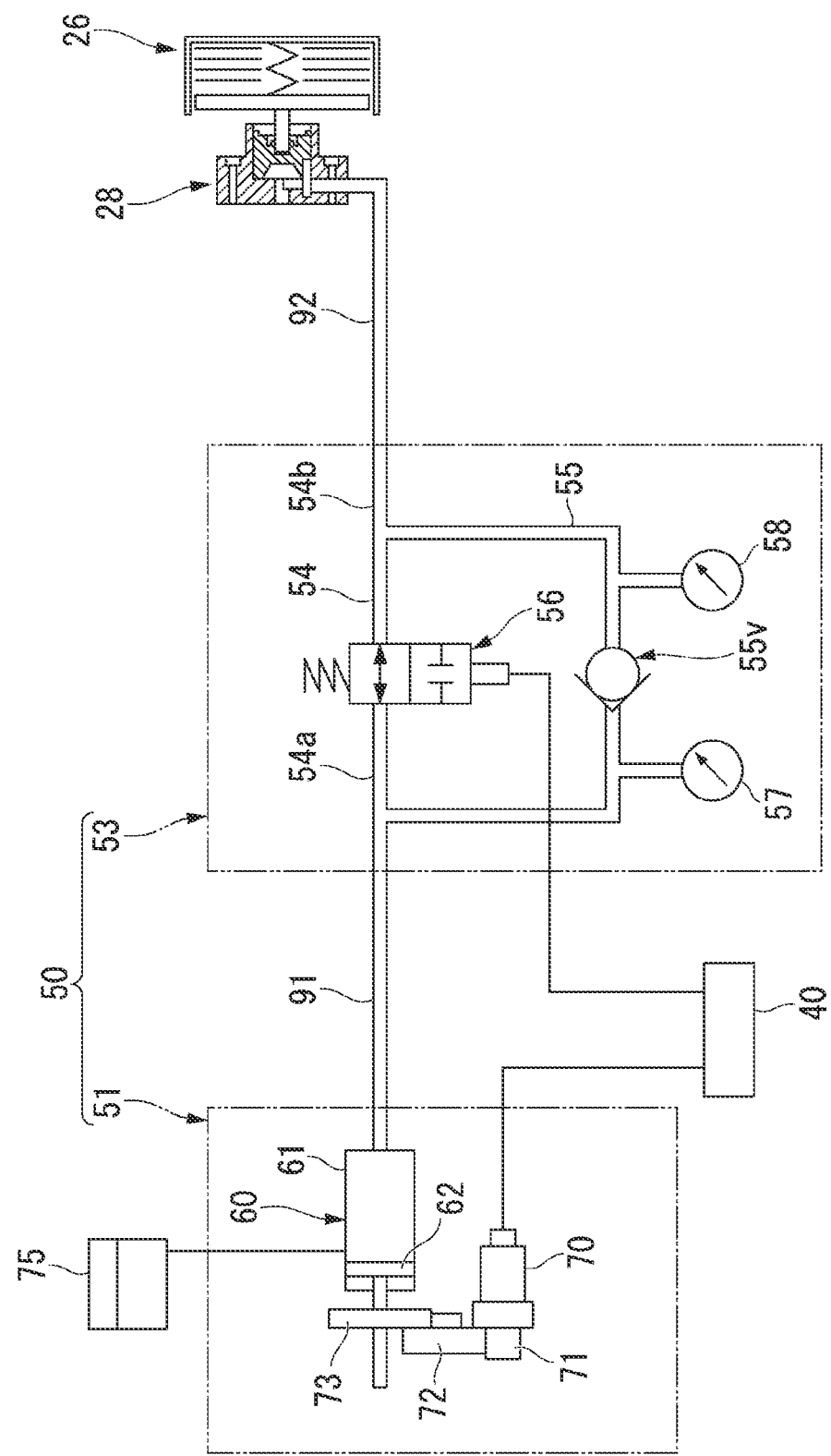
FIG. 3 is a schematic view of a clutch operation system that includes a clutch actuator of the embodiment.

As shown in FIG. 3, the clutch actuator 50 is controlled by the ECU 40 and thereby adjusts the oil pressure that connects and disconnects the clutch 26. The clutch actuator 50 includes an oil pressure actuator 51 and an oil pressure valve unit 53.

The oil pressure actuator 51 includes a motor 70 (for example, an electric motor) as a drive source and a master cylinder 60 that is driven by the motor 70.

The master cylinder 60 strokes a piston 62 in a cylinder main body 61 by a drive of the motor 70 and causes an operation oil in the cylinder main body 61 to be capable of being supplied to and discharged from the slave cylinder 28. Reference numeral 75 in the drawing represents a reserve tank that is connected to the master cylinder 60.

The piston 62 of the master cylinder 60 is connected to a drive shaft 71 of the motor 70 via a transmission gear 72 and a conversion mechanism 73. The conversion mechanism 73 converts a rotation motion of the drive shaft 71 and the transmission gear 72 into a stroke motion of the piston 62. For example, the conversion mechanism 73 is a ball screw mechanism.

The oil pressure valve unit 53 is provided between the master cylinder 60 and the slave cylinder 28. The oil pressure valve unit 53 includes a main oil passage 54, a solenoid valve 56 (valve mechanism), a bypass oil passage 55, a one-way valve 55v, and the oil pressure sensors 57 and 58.

The main oil passage 54 is an oil pressure supply/discharge oil passage that extends from the master cylinder 60 to the clutch 26 side (slave cylinder 28 side) and is formed to communicate with the master cylinder 60 side and the slave cylinder 28 side. The main oil passage 54 is divided into an upstream-side oil passage 54a closer to the master cylinder 60 than the solenoid valve 56 and a downstream-side oil passage 54b closer to the slave cylinder 28 than the solenoid valve 56.

The solenoid valve 56 opens or closes a middle portion of the main oil passage 54. The solenoid valve 56 is a normally open valve.

The bypass oil passage 55 detours the solenoid valve 56 and communicates with the upstream-side oil passage 54a and the downstream-side oil passage 54b of the main oil passage 54. The one-way valve 55v is provided on the bypass oil passage 55. The one-way valve 55v allows the operation oil to flow in a direction from the upstream-side oil passage 54a to the downstream-side oil passage 54b and regulates the flow of the operation oil in the opposite direction. That is, the one-way valve 55v allows the operation oil to flow only in the direction from the upstream side to the downstream side.

The upstream-side oil pressure sensor 57 detects the oil pressure of the operation oil on the upstream-side oil passage 54a side.

The downstream-side oil pressure sensor 58 detects the oil pressure of the operation oil on the downstream-side oil passage 54b side.

In the drawing, reference numeral 91 represents a master-side connection pipe arrangement that connects the master cylinder 60 to the oil pressure valve unit 53, and reference numeral 92 represents a slave-side connection pipe arrangement that connects the oil pressure valve unit 53 to the slave cylinder 28.

For example, the master-side connection pipe arrangement 91 is formed of a metallic material. Thereby, it is possible to prevent loss of oil pressure transmission due to expansion of the pipe arrangement.

For example, the slave-side connection pipe arrangement 92 is formed of a rubber material. Thereby, when the oil pressure of the operation oil is decreased, the slave-side connection pipe arrangement 92 shrinks, and thereby, it is possible to immediately increase the oil pressure and maintain the oil pressure.

As shown in FIG. 2, the slave cylinder 28 is arranged at a left position of the main shaft 22. The slave cylinder 28 is arranged coaxially with the main shaft 22. The slave cylinder 28 presses a push rod 29 that penetrates through the main shaft 22 rightward when supplying the oil pressure from the clutch actuator 50 (refer to FIG. 3). The slave cylinder 28 presses the push rod 29 rightward and thereby operates the clutch 26 into a connection state via the push rod 29. The slave cylinder 28 releases the pressing of the push rod 29 and allows the clutch 26 to return to a disconnection state when the oil pressure is not supplied.

In order to maintain the clutch 26 to be in a connection state, it is necessary to continue the oil pressure supply, but electric power is consumed by an amount required for continuing the oil pressure supply. Accordingly, as shown in FIG. 3, the solenoid valve 56 is provided on the oil pressure valve unit 53 of the clutch actuator 50, and the solenoid valve 56 is closed after the oil pressure supply to the clutch 26 side. Thereby, energy consumption is prevented by employing a configuration in which the oil pressure supply to the clutch 26 side is maintained, and the oil pressure is supplemented by an amount of pressure decrease (only the leakage amount is recharged).

<Clutch Control>

Figure 5:
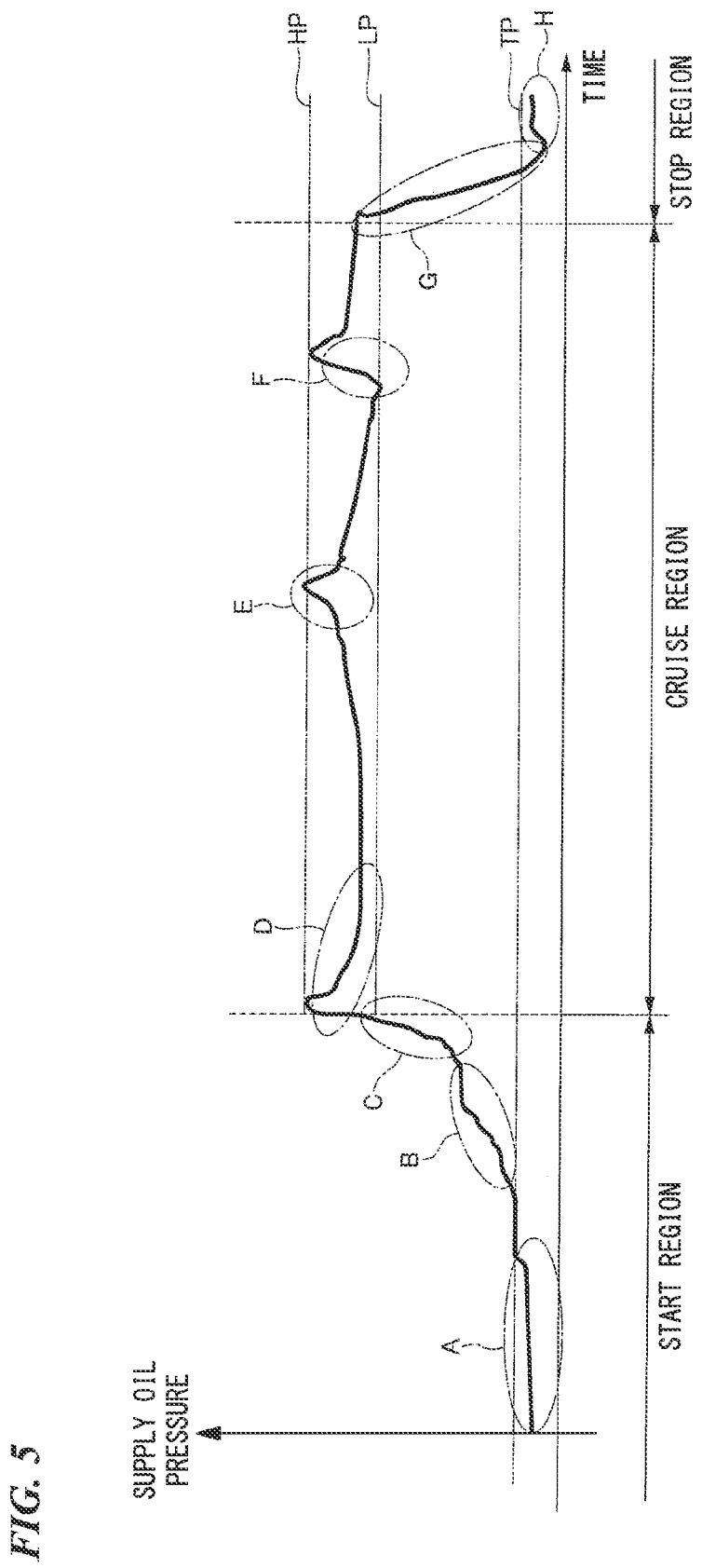
FIG. 5 is a graph showing a change in a supply oil pressure of the clutch actuator of the embodiment.

Next, the action of the clutch control system is described with reference to the graph of FIG. 5. In the graph of FIG. 5, the vertical axis indicates a supply oil pressure that is detected by the downstream-side oil pressure sensor 58, and the horizontal axis indicates an elapsed time.

When the motorcycle 1 stops (at the time of idling), both the motor 70 and the solenoid valve 56 controlled by the ECU 40 are in a state in which electric power supply is disconnected. That is, the motor 70 is in a stop state, and the solenoid valve 56 is in an open valve state. At this time, the slave cylinder 28 side (downstream side) becomes a low-pressure state in which the pressure is lower than a touch point oil pressure TP, and the clutch 26 becomes a non-connection state (disconnection state, release state). This state corresponds to a region A of FIG. 5.

When the rotation number of the engine 13 is increased at the time of starting of the motorcycle 1, electric power is supplied only to the motor 70, and the oil pressure is supplied to the slave cylinder 28 from the master cylinder 60 via the solenoid valve 56 in an open valve state. When the oil pressure on the slave cylinder 28 side (downstream side) is increased to the touch point oil pressure TP or more, the fastening of the clutch 26 is started, and the clutch 26 becomes a half clutch state capable of transmitting part of power. Thereby, smooth start of the motorcycle 1 becomes possible. This state corresponds to a region B of FIG. 5.

When the oil pressure on the slave cylinder 28 side (downstream side) reaches a lower-limit-maintaining oil pressure LP, the fastening of the clutch 26 is completed, and all of the drive force of the engine 13 is transmitted to the transmission 21. This state corresponds to a region C of FIG. 5.

Then, when the oil pressure on the slave cylinder 28 side (downstream side) reaches an upper-limit-maintaining oil pressure HP, electric power is supplied to the solenoid valve 56, the solenoid valve 56 is operated to be closed, the electric power supply to the motor 70 is stopped, and generation of the oil pressure is stopped. That is, the upstream side becomes a low-pressure state by the oil pressure being released, and on the other hand, the downstream side is maintained in a high-pressure state (the upper-limit-maintaining oil pressure HP). Thereby, the master cylinder 60 does not generate the oil pressure, the clutch 26 is maintained in the connection state, and it is possible to prevent electric power consumption while enabling travel of the motorcycle 1.

Even in a state where the solenoid valve 56 is closed, the oil pressure on the downstream side gradually decreases (leaks) as in a region D of FIG. 5 by a factor such as a temperature decrease or an oil pressure leakage due to deformation of the seal of the solenoid valve 56 and the one-way valve 55v or the like. On the other hand, the oil pressure on the downstream side may increase due to a temperature increase or the like as in a region E of FIG. 5. A slight oil pressure variation on the downstream side can be absorbed by an accumulator (not shown), and the electric power consumption is not increased by operating the motor 70 and the solenoid valve 56 at every oil pressure variation.

In a case where the oil pressure on the downstream side is increased to the upper-limit-maintaining oil pressure HP as in a region E of FIG. 5, by decreasing the electric power supply to the solenoid valve 56 or the like, the solenoid valve 56 is made to be in an open state in a step-by-step manner, and the oil pressure on the downstream side is relieved to the upstream side.

In a case where the oil pressure on the downstream side is decreased to a lower-limit-maintaining oil pressure LP as in a region F of FIG. 5, electric power supply to the motor 70 is started while closing the solenoid valve 56, and the oil pressure on the upstream side is increased. When the oil pressure on the upstream side exceeds the oil pressure on the downstream side, the oil pressure is supplied (recharged) to the downstream side via the bypass oil passage 55 and the one-way valve 55v. When the oil pressure on the downstream side becomes the upper-limit-maintaining oil pressure HP, the electric power supply to the motor 70 is stopped, and generation of the oil pressure is stopped. Thereby, the oil pressure on the downstream side is maintained between the upper-limit-maintaining oil pressure HP and the lower-limit-maintaining oil pressure LP, and the clutch 26 is maintained in the connection state.

At the time of stopping of the motorcycle 1, electric power supply to the motor 70 and electric power supply to the solenoid valve 56 are both stopped. Thereby, the master cylinder 60 stops generating the oil pressure and stops supplying the oil pressure to the slave cylinder 28. The solenoid valve 56 becomes an open state, and the oil pressure in the downstream-side oil passage 54b is caused to return to the reserve tank 75. As a result, the slave cylinder 28 side (downstream side) becomes a low-pressure state in which the pressure is lower than the touch point oil pressure TP, and the clutch 26 becomes a non-connection state. This state corresponds to regions G and H of FIG. 5.

<Oil Pressure Actuator>

Next, the oil pressure actuator 51 of the embodiment is described with reference to FIG. 11.

Figure 11:
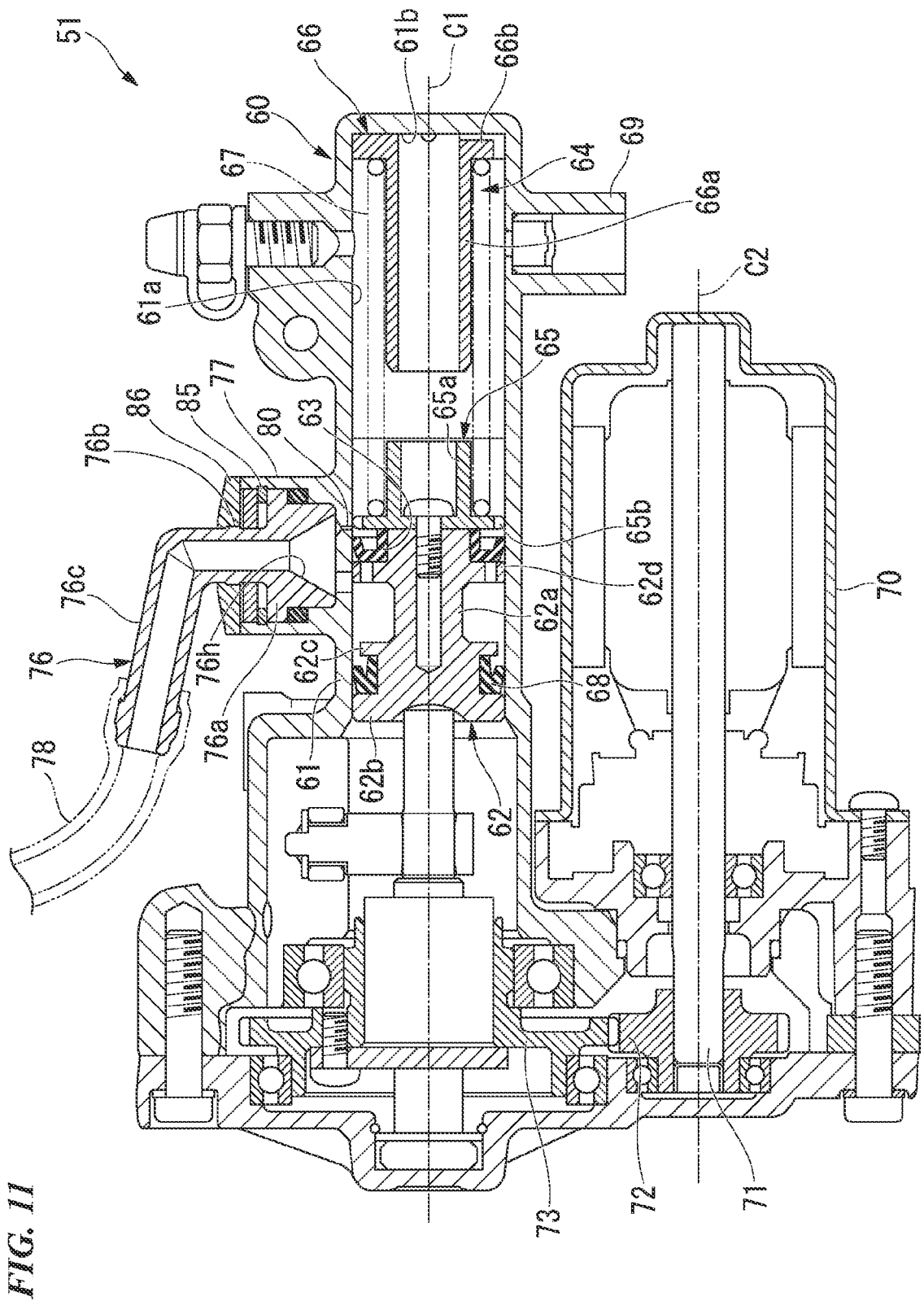
FIG. 11 is a cross-sectional view of an oil pressure actuator of the embodiment.

As shown in FIG. 11, the oil pressure actuator 51 includes the master cylinder 60 that generates the oil pressure on the operation oil for operating the clutch 26 (refer to FIG. 3) and the motor 70 (drive source) for driving the master cylinder 60.

The master cylinder 60 includes: the cylinder main body 61 having a cylindrical shape; a piston 62 that moves in an axis direction of the cylinder main body 61 by a drive of the motor 70; and a cup seal 63 (seal member) provided on a front end of the piston 62 and that comes into contact with an inner wall 61a of the cylinder main body 61.

Reference numeral 64 in the drawing represents a spring unit causing the piston 62 to return to an initial position.

The piston 62 includes: a cylindrical main body 62a arranged coaxially with a center axis line C1 (hereinafter, also referred to as a "cylinder axis line C1") of the cylinder main body 61 and defining a cylindrical shape smaller than an inner diameter of the cylinder main body 61; a base end annular part 62b provided on a base end (an end on the opposite side of a front end of the cylindrical main body 62a) of the cylindrical main body 62a and having an annular shape; a base end-side protrusion part 62c provided close to a base end of the cylindrical main body 62a and protruding radially outward from the cylindrical main body 62a; and a front end-side annular part 62d provided close to a front end of the cylindrical main body 62a and having an annular shape. For example, the cylindrical main body 62a, the base end annular part 62b, the base end-side protrusion part 62c, and the front end-side annular part 62d are integrally formed of the same member. Reference numeral C2 in the drawing represents the center axis line (hereinafter, also referred to as a "motor axis line") of the motor 70 (the drive shaft 71) that is substantially parallel to the cylinder axis line C1.

The cup seal 63 has an annular shape that is attachable to and detachable from a front end part of the cylindrical main body 62a. For example, the cup seal is formed of an elastic member such as rubber. The cup seal 63 is arranged between the front end-side annular part 62d and a first guide 65 (first annular part 65b) in the axis direction of the cylinder main body 61. Reference numeral 68 in the drawing represents a seal member having an annular shape arranged between the base end annular part 62b and the base end-side protrusion part 62c in the axis direction of the cylinder main body 61.

The spring unit 64 includes: the first guide 65 that is in contact with a front end of the piston 62 (cylindrical main body 62a); a second guide 66 that is in contact with a bottom wall 61b of the cylinder main body 61; and a spring 67 provided between the first guide 65 and the second guide 66. The spring unit 64 constantly biases the piston 62 in the axis direction of the cylinder main body 61 toward the opposite side of the bottom wall 61b of the cylinder main body 61. Reference numeral 69 in the drawing indicates an oil passage connection part to which the upstream-side oil passage 54a (one end part of the master-side connection pipe arrangement 91, refer to FIG. 3) is connected.

The first guide 65 includes: a first cylinder part 65a that defines a cylindrical shape coaxial with the cylinder axis line C1; and a first annular part 65b having an annular shape that is connected to one end (an end on the piston 62 side) of the first cylinder part 65a.

The second guide 66 includes: a second cylinder part 66a that defines a cylindrical shape coaxial with the cylinder axis line C1 and longer than the first cylinder part 65a; and a second annular part 66b having an annular shape connected to one end (an end on the opposite side of the piston 62) of the second cylinder part 66a.

The spring 67 is arranged between the first annular part 65b and the second annular part 66b. The spring 67 constantly biases the piston 62 toward the opposite side of the slave cylinder 28 (refer to FIG. 3) via the first guide 65.

The cylinder main body 61 includes a reserve port 80 for allowing the operation oil in the cylinder main body 61 to return to the reserve tank 75 (refer to FIG. 3). In the drawing, reference numeral 76 represents a derivation member that derives the operation oil from the reserve port 80 to the reserve tank 75, reference numeral 77 represents an attachment member for attaching the derivation member 76 to the cylinder main body 61, and reference numeral 78 represents a reserve pipe arrangement for connecting the derivation member 76 to the reserve tank 75 (refer to FIG. 1).

The reserve port 80 and the attachment member 77 are arranged on one side part in a radial direction of the cylinder main body 61. Specifically, each of the reserve ports 80 and the attachment member 77 is provided on a side part on the opposite side of the motor 70 in the cylinder main body 61. That is, neither the reserve port 80 nor the attachment member 77 is provided on a side part on the motor 70 side in the cylinder main body 61.

The derivation member 76 includes: a connection part 76*a* that is connected to the attachment member 77; a first derivation part 76*b* having a tubular shape that extends outward in the radial direction of the cylinder main body 61 from the connection part 76*a*; and a second derivation part 76*c* having a tubular shape that extends in a direction which diagonally crosses the radial direction of the cylinder main body 61 from an end part of the first derivation part 76*b* on the opposite side of the connecting portion 76*a*. For example, the connection part 76*a*, the first derivation part 76*b*, and the second derivation part 76*c* are integrally formed of the same member.

The connection part 76*a* has a communication hole 76*h* having a taper shape in a cross section that becomes thinner at a farther position from the cylinder main body 61 in the radial direction of the cylinder main body 61. The communication hole 76*h* communicates with the reserve port 80. In the drawing, reference numeral 85 represents a circlip, and reference numeral 86 represents a dust cover.

For example, the attachment member 77 is formed integrally with one side part in the radial direction of the cylinder main body 61 by the same member as the cylinder main body 61. The attachment member 77 defines a tubular shape that opens in the radial direction of the cylinder main body 61.

<Oil Pressure Valve Unit>

Next, the oil pressure valve unit 53 of the embodiment is described with reference to FIG. 12.

Figure 12:
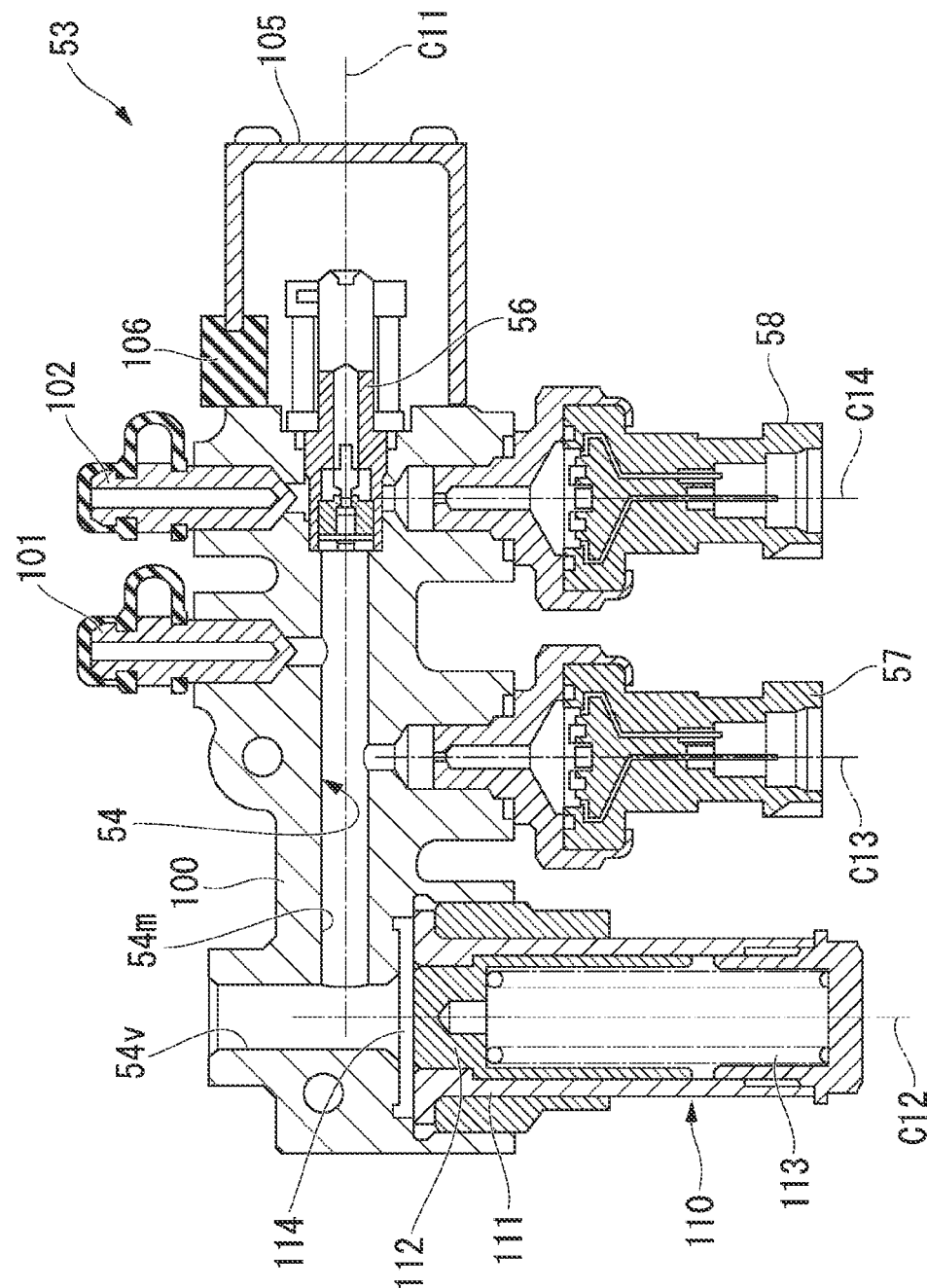
FIG. 12 is a cross-sectional view of an oil pressure valve unit of the embodiment.

As shown in FIG. 12, the oil pressure valve unit 53 includes: a valve body 100 having an oil passage that includes the main oil passage 54; the solenoid valve 56 that opens or blocks the main oil passage 54; an accumulator 110 that absorbs the variation of the oil pressure of the main oil passage 54; a plurality of oil pressure sensors 57 and 58 that detect the oil pressure of the operation oil; and a plurality of bleeder members 101 and 102 for draining air contained in the operation oil. In the drawing, reference numeral 105 represents a valve cover that covers the solenoid valve 56, and reference numeral 106 represents a grommet.

The main oil passage 54 includes a main part 54*m* that extends in one direction and a standing part 54*v* that stands from an end portion of the main part 54*m*. Reference numeral C11 in the drawing represents an axis line (hereinafter, also referred to as a "body axis line") along the extension direction of the main part 54*m*.

The solenoid valve 56 is connected to one end part of the valve body 100. The solenoid valve 56 is arranged coaxially with the body axis line C11.

The accumulator 110 is connected to a joint portion of the main part 54*m* and the standing part 54*v* of the main oil passage 54. The accumulator 110 includes: a cylinder body 111 having a cylindrical shape; a piston 112 that is movable in the axis direction of the cylinder body 111; a coil spring 113 that biases the piston 112 toward the main oil passage 54; and a diaphragm 114 provided between the piston 112 and the main oil passage 54. Reference numeral C12 in the drawing represents a center axis line (hereinafter, also referred to as the "accumulator axis line") of the cylinder body 111. The accumulator axis line C12 is substantially orthogonal to the body axis C11.

When the oil pressure of the main oil passage 54 is increased to a threshold value or more, the diaphragm 114 is pressed. Then, the piston 112 is pressed via the diaphragm 114. Then, the piston 112 is pressed against an elastic force of the coil spring 113. Thereby, the accumulator 110 accumulates the oil pressure.

On the other hand, when the oil pressure of the main oil passage 54 is decreased to a threshold value or less, the piston 112 is moved to the main oil passage 54 side by an elastic force of the coil spring 113. Then, the operation oil is caused to return to the main oil passage 54. Thereby, the accumulator 110 increases the oil pressure of the main oil passage 54 and absorbs the variation of the oil pressure.

The oil pressure sensors 57 and 58 (the upstream-side oil pressure sensor 57 and the downstream-side oil pressure sensor 58) are connected to a side part on the same side as the accumulator 110 in the valve body 100. The oil pressure sensors 57 and 58 have a center axis line that is substantially parallel to the accumulator axis line C12. In the drawing, reference numeral C13 indicates a center axis line (hereinafter, also referred to as an "upstream-side sensor axis line") of the upstream-side oil pressure sensor 57, and reference numeral C14 indicates a center axis line (hereinafter, also referred to as a "downstream-side sensor axis line") of the downstream-side oil pressure sensor 58.

The bleeder members 101 and 102 are connected to a side part on the opposite side of the accumulator 110 (the oil pressure sensors 57 and 58) in the valve body 100. The bleeder members 101 and 102 are arranged above the main oil passage 54 in a state where the valve body 100 is attached to the vehicle body.

Next, an action at the time of connection and disconnection of the clutch 26 is described with reference to FIG. 3 and the like.

The clutch 26 is connected by the oil pressure generated by a drive of the piston 62 and maintains the oil pressure by the oil pressure valve unit 53 at the time of connection of the oil pressure clutch 26. While the oil pressure is maintained by the oil pressure valve unit 53, the piston 62 returns to a position that does not generate the oil pressure. In this case, the piston 62 returns to an initial position by a biasing force of the spring 67 (refer to FIG. 11). At the time of disconnection of the clutch 26, the oil pressure is decreased by opening the oil pressure valve unit 53.

<Arrangement Structure of Oil Pressure Valve Unit>

Figure 6:
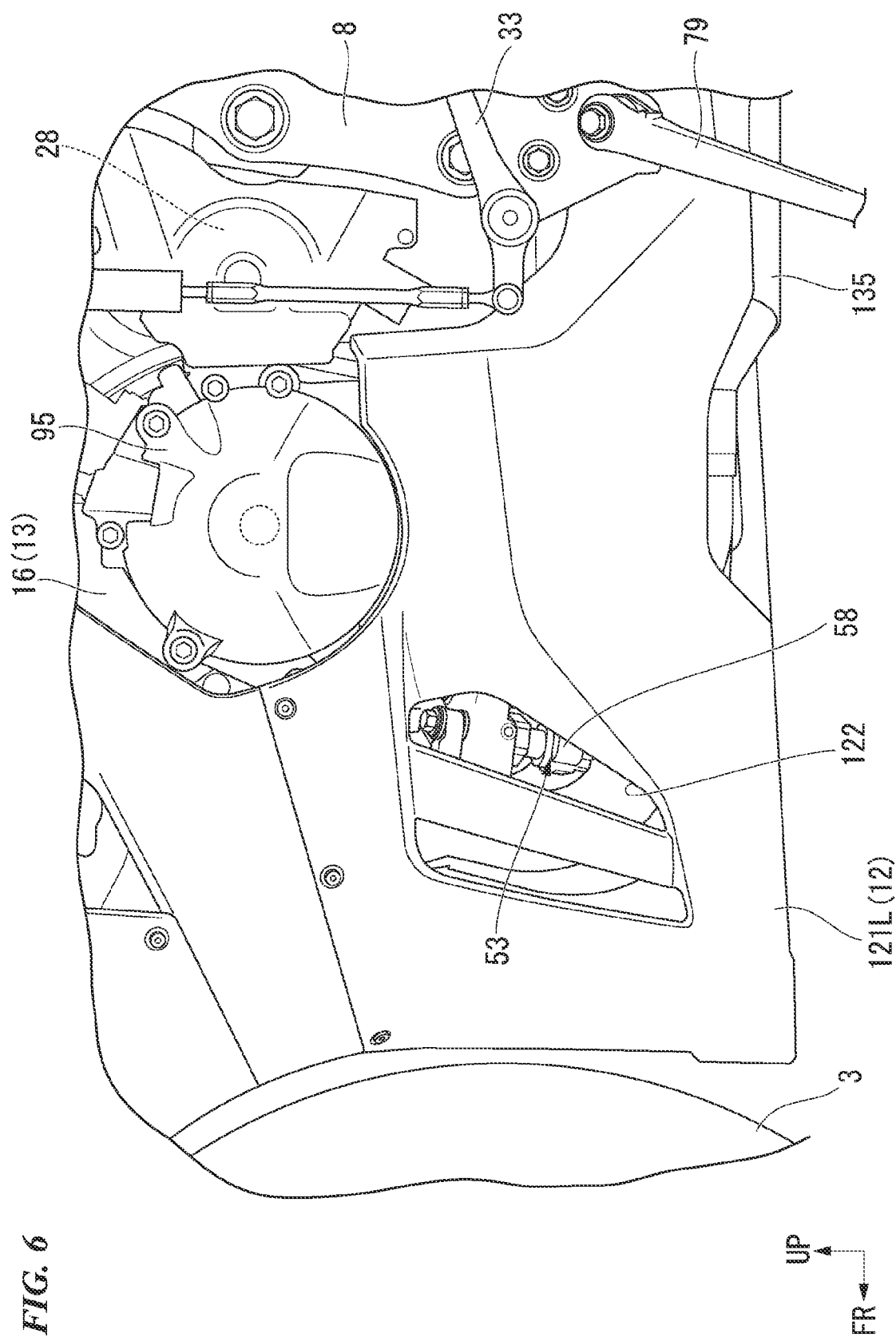
FIG. 6 is an enlarged view of a main part of the left side of the motorcycle of the embodiment.

As shown in FIG. 6, the oil pressure valve unit 53 is arranged on a left side part of the vehicle. Reference numeral 121L in the drawing represents a left under cowl (cowl member) that covers a vehicle body left lower part. Part of the oil pressure valve unit 53 is covered from the left side and the lower side by the left under cowl 121L. The left under cowl 121L has an opening part 122 that exposes a portion (the downstream-side oil pressure sensor 58 or the like) of the oil pressure valve unit 53 to the left direction.

Figure 7:
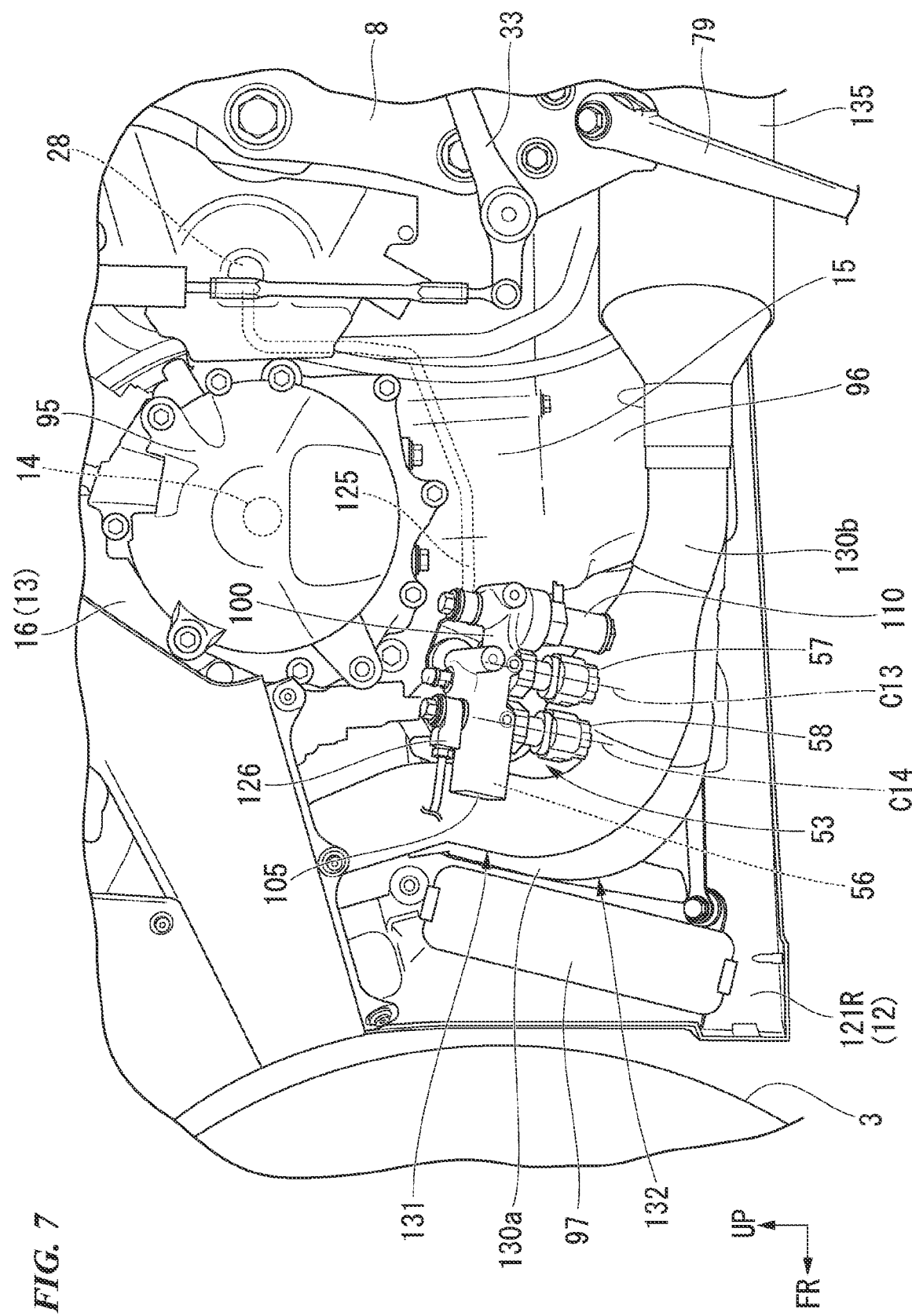
FIG. 7 is a view showing a state in which a left under cowl is removed in FIG. 6.

As shown in FIG. 7, the oil pressure valve unit 53 is arranged at a front lower position of the engine 13. The oil pressure valve unit 53 is arranged such that the solenoid valve 56 (the valve cover 105) is located at a front position, and the accumulator 110 is located at a rear position. Reference numeral 95 in the drawing represents an ACG cover that covers an AC generator (not shown) provided on a left end part of the crankshaft 14 from the left direction. The oil pressure valve unit 53 is arranged at a front lower position of the ACG cover 95. Reference numeral 96 in the drawing represents an oil pan that is located at a lower position of the crankcase 15. The oil pressure valve unit 53 is arranged at a front upper position of the oil pan 96.

In the drawing, reference numeral 97 represents an oil cooler that is located at a rear position of the front wheel 3. In a side view, the oil cooler 97 is inclined such that an upper end part is located at a rear position, and a lower end part is located at a front position. In a side view, the oil pressure valve unit 53 is arranged at a rear position of the oil cooler 97.

Reference numerals 131 to 134 in the drawing represent a discharge pipe (in FIG. 7, a first discharge pipe 131 and a second discharge pipe 132 are shown) connected to a front part of the cylinder 16. The discharge pipe 131 includes a downward extending part 130a that extends downward from the front part of the cylinder 16. The discharge pipe 132 includes a rearward extending part 130b that extends rearward from a lower end portion of the downward extending part 130a. The oil pressure valve unit 53 is arranged in the vicinity of a connection portion of the downward extending part 130a and the rearward extending part 130b. Reference numeral 135 in the drawing represents a manifold to which rear end parts of the discharge pipes 131 and 132 are connected. A catalyst device (not shown) is accommodated in the manifold 135.

In the drawing, reference numeral 125 represents a slave-side joint member for connecting another end part of the slave-side connection pipe arrangement 92 (refer to FIG. 3) of which one end part is connected to the slave cylinder 28, and reference numeral 126 represents a master-side joint member for connecting another end part of the master-side connection pipe arrangement 91 (refer to FIG. 3) of which one end part is connected to the master cylinder 60. The slave-side joint member 125 is provided on a rear upper part of the oil pressure valve unit 53 (the valve body 100).

In the present embodiment, the accumulator 110 is located at a rear part of the oil pressure valve unit 53, and thereby, a pipe arrangement (the slave-side connection pipe arrangement 92) that extends to the slave cylinder 28 from the joint member (the slave-side joint member 125) on the accumulator 110 side can be shortened compared to a case in which the accumulator 110 is located at a front part of the oil pressure valve unit 53.

The master-side joint member 126 is provided on a front upper part of the oil pressure valve unit 53 (the valve body 100).

The arrangement of the master-side connection pipe arrangement 91 is suitably selected in accordance with the vehicle body structure so as to be shortened as much as possible while avoiding interference with another component. For example, the master-side connection pipe arrangement 91 is arranged in front of the engine 13.

<Arrangement Structure of Oil Pressure Actuator>

Figure 8:
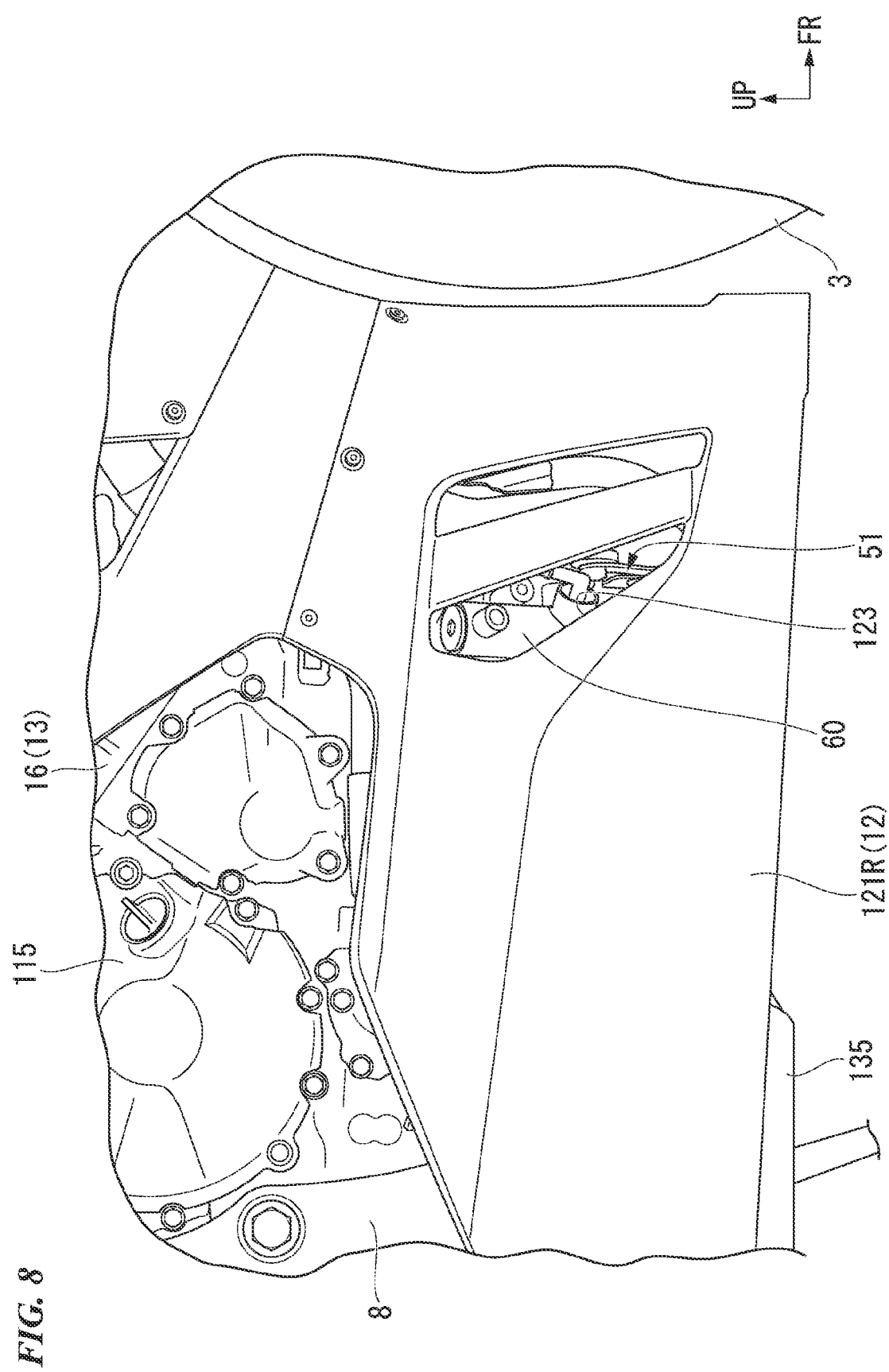
FIG. 8 is an enlarged view of a main part of the right side of the motorcycle of the embodiment.

As shown in FIG. 8, the oil pressure actuator 51 is arranged on a vehicle right side part. Reference numeral 121R in the drawing represents a right under cowl (cowl member) that covers a vehicle body right lower part. A portion of the oil pressure actuator 51 is covered from the right side and the lower side by the right under cowl 121R. The right under cowl 121R has an opening part 123 that exposes a portion (the master cylinder 60 or the like) of the oil pressure actuator 51 to the right side.

Figure 9:
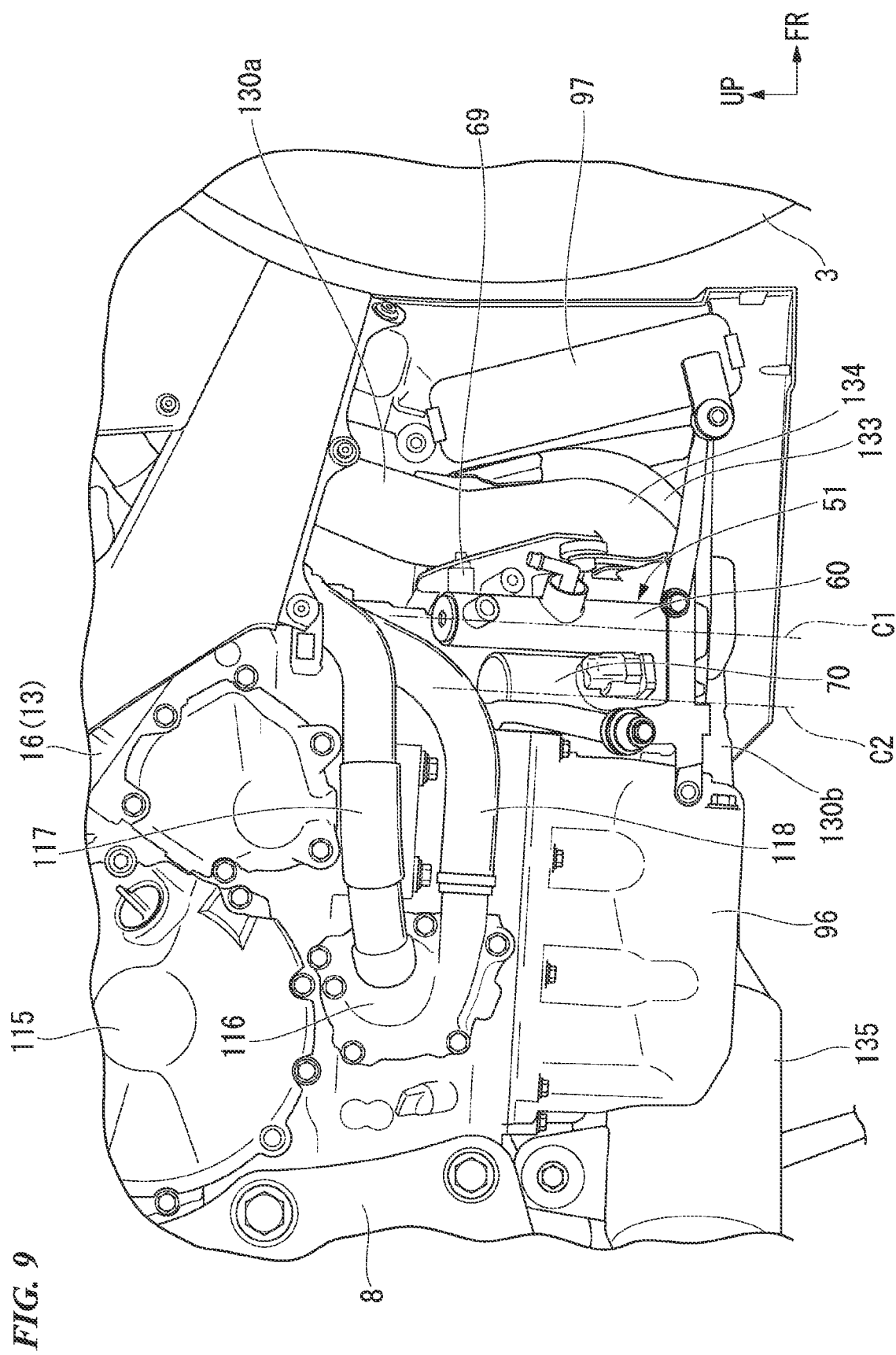
FIG. 9 is a view showing a state in which a right under cowl is removed in FIG. 8.

As shown in FIG. 9, the oil pressure actuator 51 is arranged at a front lower part of the engine 13. The oil pressure actuator 51 is arranged such that the master cylinder 60 is located at the front part, and the motor 70 is located at the rear part. Reference numeral 115 in the drawing represents a clutch cover provided on a right side part of the transmission case 17 (refer to FIG. 2) and covering the clutch 26 (refer to FIG. 2) from the right side. The oil pressure actuator 51 is arranged in front of and below the clutch cover 115. The oil pressure actuator 51 is arranged in front of and above the oil pan 96.

In the drawing, reference numeral 116 represents a water pump located below the clutch cover 115, and reference numerals 117 and 118 represent pipe arrangements each connected to the water pump 116. The oil pressure actuator 51 is arranged in front of and below the water pump 116. The oil pressure actuator 51 is arranged at a position that avoids the pipe arrangements 117 and 118.

In a side view, the oil pressure actuator 51 is arranged at a rear position of the oil cooler 97. The oil pressure actuator 51 is arranged at a rear position of the downward extending part 130a of the discharge pipe (fourth discharge pipe 134). Reference numeral 69 in the drawing represents an oil passage connection part (hereinafter, also referred to as a "valve-side joint member") for connecting the upstream-side oil passage 54a (one end part of the master-side connection pipe arrangement 91, refer to FIG. 3). The valve-side joint member 69 is provided on a front upper end part of the master cylinder 60.

<Arrangement Structure in Bank Range>

Figure 10:
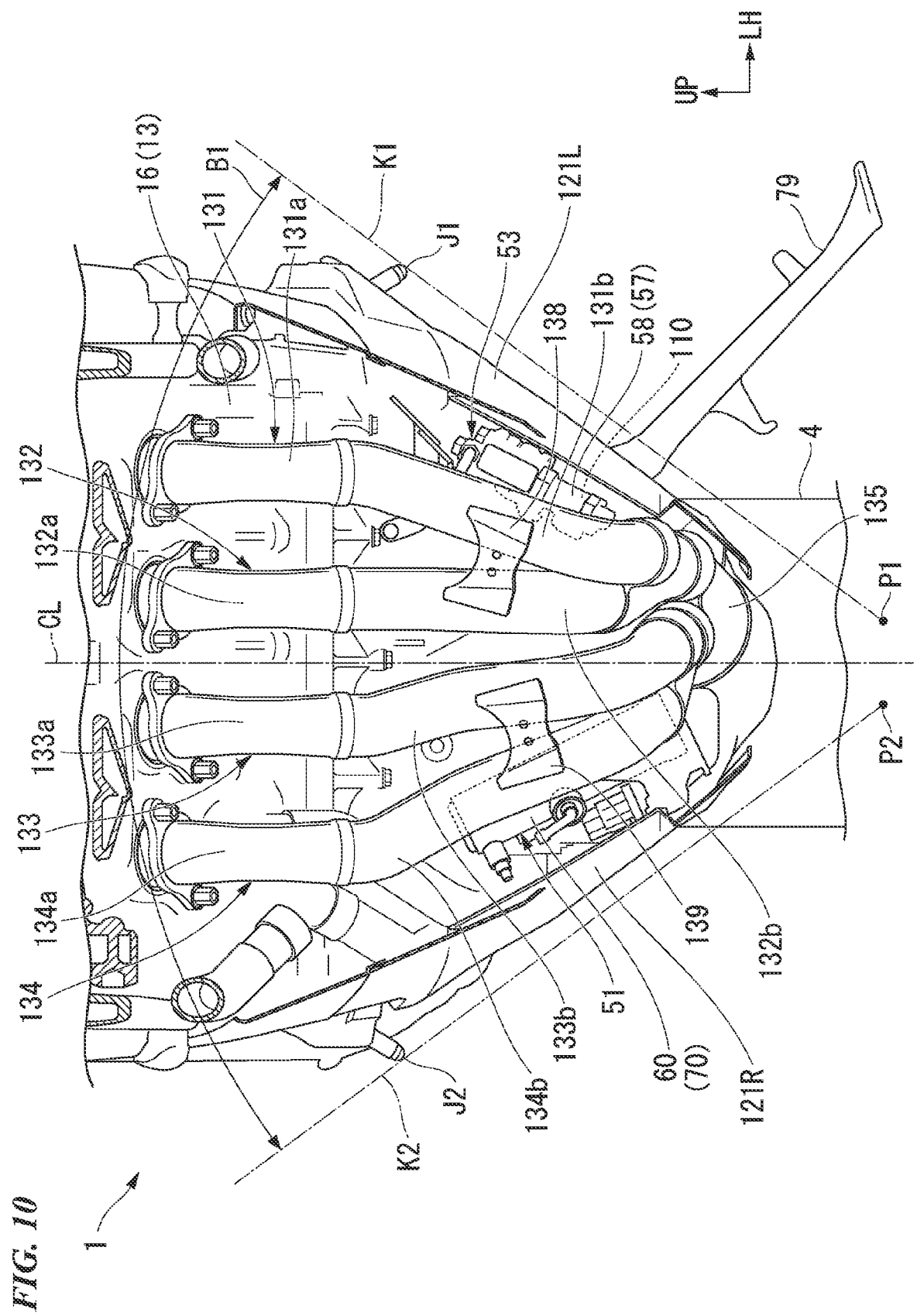
FIG. 10 is view that includes an X-X cross section of FIG. 1 and is a view showing a bank range of the motorcycle.

FIG. 10 corresponds to a front view of an arrangement structure of the oil pressure valve unit 53 and the oil pressure actuator 51. In the drawing, reference numeral B1 represents a bank range, reference numeral P1 represents a left end position (hereinafter, referred to as a "rear wheel ground contact left end position") of a ground contact surface of the rear wheel 4, reference numeral P2 represents a right end position (hereinafter, referred to as a "rear wheel ground contact right end position") of a ground contact surface of the rear wheel 4, reference numeral K1 represents a first virtual straight line that passes through the rear wheel ground contact left end position P1 and a downward protrusion part front end J1 of a left step, and reference numeral K2 represents a second virtual straight line that passes through the rear wheel ground contact right end position P2 and a downward protrusion part front end J2 of a right step. The bank range B1 means a range of an acute angle formed of the first virtual straight line K1 and the second virtual straight line K2. The bank range B1 corresponds to a range for setting the bank angle at the time of traveling of the vehicle.

As shown in FIG. 10, the oil pressure actuator 51 and the oil pressure valve unit 53 are arranged in the bank range B1. In a front view, the oil pressure actuator 51 and the oil pressure valve unit 53 face each other in the vehicle width direction via a lower part of the engine 13. Part of the oil pressure actuator 51 and the oil pressure valve unit 53 is covered by the discharge pipes 131 to 134 from the front direction.

The vehicle includes a plurality of discharge pipes 131 to 134 connected to a front part of the cylinder 16. The plurality of discharge pipes 131 to 134 are a first discharge pipe 131, a second discharge pipe 132, a third discharge pipe 133, and a fourth discharge pipe 134 arranged in this order toward the right side part from the left side part of the vehicle.

In a front view, the first discharge pipe 131 includes: a first upper extension part 131a that extends linearly downward from a front part of the cylinder 16; and a first lower extension part 131b that extends (extends to be inclined such that the upper end part is located at an outer position in the vehicle width direction, and the lower end part is located at an inner position in the vehicle width direction) from a lower end portion of the first upper extension part 131a to be inclined such that the lower side is located at an inner position in the vehicle width direction. A portion of the oil pressure valve unit 53 is covered by the first lower extension part 131b from the front direction.

In a front view, the second discharge pipe 132 includes: a second upper extension part 132a that extends linearly downward from a front part of the cylinder 16; and a second lower extension part 132b that extends linearly downward from a lower end portion of the second upper extension part 132a. A lower end of the second lower extension part 132b is located at a higher position than a lower end of the first lower extension part 131b. Reference numeral 138 in the drawing represents a connection member that connects the first lower extension part 131b to the second lower extension part 132b.

In a front view, the third discharge pipe 133 includes: a third upper extension part 133a that extends linearly downward from a front part of the cylinder 16; and a third lower extension part 133b that extends (extends to be inclined such that the upper end part is located at an outer position in the vehicle width direction, and the lower end part is located at an inner position in the vehicle width direction) from a lower end portion of the third upper extension part 133a to be inclined such that the lower side is located at an inner position in the vehicle width direction. A lower end of the third lower extension part 133b is located at a lower position than a lower end of the first lower extension part 131b.

In a front view, the fourth discharge pipe 134 includes: a fourth upper extension part 134a that extends linearly downward from a front part of the cylinder 16; and a fourth lower extension part 134b that extends (extends to be inclined such that the upper end part is located at an outer position in the vehicle width direction, and the lower end part is located at an inner position in the vehicle width direction) from a lower end portion of the fourth upper extension part 134a to be inclined such that the lower side is located at an inner position in the vehicle width direction. A portion of the oil pressure actuator 51 is covered by the fourth lower extension part 134b from the front direction. Reference numeral 139 in the drawing represents a connection member that connects the third lower extension part 133b to the fourth lower extension part 134b.

As shown in FIG. 7, in a left side view, the oil pressure valve unit 53 is arranged such that the sensor axis lines C13 and C14 are directed in the vertical direction. Specifically, the sensor axis lines C13 and C14 are inclined slightly rearward relative to the vertical line. In a left side view, the oil pressure sensors 57 and 58 are arranged to be inclined such that the upper end part is located at a rear position, and the lower end part is located at a front position. In a front view, the oil pressure sensors 57 and 58 are arranged to be inclined such that the upper end part is located at an outer position in the vehicle width direction, and the lower end part is located at an inner position in the vehicle width direction (refer to FIG. 10).

As shown in FIG. 9, in a right side view, the oil pressure actuator 51 is arranged such that the cylinder axis line C1 and the motor axis line C2 are directed in the vertical direction. In a left side view, each of the cylinder axis line C1 and the motor axis line C2 is substantially parallel to the vertical line. In a front view, each of the master cylinder 60 and the motor 70 is arranged to be inclined such that the upper end part is located at an outer position in the vehicle width direction, and the lower end part is located at an inner position in the vehicle width direction (refer to FIG. 10).

As described above, the motorcycle 1 of the embodiment described above includes: the transmission 21 that includes the clutch 26 operated by an operation of the slave cylinder 28; the oil pressure actuator 51 that includes the master cylinder 60 which generates an oil pressure on an operation oil; the oil pressure valve unit 53 that controls transmission of the oil pressure generated by the master cylinder 60 to the slave cylinder 28; the master-side connection pipe arrangement 91 that connects the master cylinder 60 to the oil pressure valve unit 53; and the slave-side connection pipe arrangement 92 that connects the oil pressure valve unit 53 to the slave cylinder 28. The slave cylinder 28 and the oil pressure valve unit 53 are arranged on the vehicle left side part, and the oil pressure actuator 51 is arranged on the vehicle right side part.

According to this configuration, since the slave cylinder 28 and the oil pressure valve unit 53 are arranged on the same side part in the width direction, it is possible to cause the slave cylinder 28 and the oil pressure valve unit 53 to be closer to each other. Thereby, it is possible to shorten the slave-side connection pipe arrangement 92, and the oil pressure that is controlled by the oil pressure valve unit 53 can be quickly transmitted to the slave cylinder 28. Accordingly, it is possible to enhance the operation responsiveness of the oil pressure control of the clutch 26. Additionally, by separating the oil pressure actuator 51 from the oil pressure valve unit 53, it is possible to enhance the degree of arrangement freedom of the oil pressure actuator 51 and the oil pressure valve unit 53. Additionally, since the oil pressure actuator 51 and the oil pressure valve unit 53 are distributed to both side parts in the vehicle width direction, it is possible to favorably maintain the weight balance of the vehicle.

In the embodiment described above, the clutch 26 is arranged on the vehicle right side part, and thereby, the following advantage is achieved.

Since the clutch 26 and the slave cylinder 28 are distributed to both side parts in the vehicle width direction, it is possible to prevent the transmission 21 from projecting to only one side in the vehicle width direction.

In the embodiment described above, by further including the under cowls 121L and 121R that cover a portion of the oil pressure actuator 51 and the oil pressure valve unit 53 from the outside, the following advantage is achieved.

It is possible to protect the portion of the oil pressure actuator 51 and the oil pressure valve unit 53 from a disturbance such as a flying rock by the under cowls 121L and 121R.

In the embodiment described above, the oil pressure actuator 51 and the oil pressure valve unit 53 are arranged within the bank range B1 of the vehicle, and thereby, the following advantage is achieved.

It is possible to prevent the bank angle of the vehicle from being affected.

In the embodiment described above, the engine 13 arranged in front of the transmission 21 is further provided, the engine 13 includes the cylinder 16 that stands upward, the oil pressure actuator 51 and the oil pressure valve unit 53 are arranged in front of and below the engine 13, and thereby, the following advantage is achieved. In a case of an upright engine having a cylinder 16 in which the engine 13 stands upward, there is a space in front of and below the engine 13. Therefore, the oil pressure actuator 51 and the oil pressure valve unit 53 are arranged in a space in front of and below the engine 13, and thereby, it is possible to prevent the degree of arrangement freedom of another component from being impaired.

In the embodiment described above, the discharge pipes 131 to 134 connected to the front part of the cylinder 16 are further provided, a portion of the oil pressure actuator 51 and the oil pressure valve unit 53 is covered by the discharge pipes 131 to 134 from the front direction, and thereby, the following advantage is achieved.

It is possible to protect the portion of the oil pressure actuator 51 and the oil pressure valve unit 53 from a disturbance such as a flying rock by the discharge pipes 131 to 134.

In the embodiment described above, the oil pressure actuator 51 further includes the motor 70 for driving the master cylinder 60, the master cylinder 60 and the motor 70 are arranged such that the longitudinal direction is directed in the vertical direction and are arranged to be inclined such that the upper end part is located at the outer position in the vehicle width direction, and the lower end part is located at the inner position in the vehicle width direction, and thereby, the following advantage is achieved.

It is possible to prevent the bank angle of the vehicle from being affected.

In the embodiment described above, the oil pressure valve unit 53 includes the oil pressure sensors 57 and 58 arranged such that the longitudinal direction is directed in the vertical direction and arranged to be inclined such that the upper end part is located at the outer position in the vehicle width direction, and the lower end part is located at the inner position in the vehicle width direction, and thereby, the following advantage is achieved.

It is possible to prevent the bank angle of the vehicle from being affected.

MODIFIED EXAMPLE

The above embodiment is described using an example in which the slave cylinder 28 and the oil pressure valve unit 53 are arranged on the vehicle left side part (one side part in the vehicle width direction), and the oil pressure actuator 51 is arranged on the vehicle right side part (another side part in the vehicle width direction); however, the embodiment is not limited thereto. For example, the slave cylinder 28 and the oil pressure valve unit 53 may be arranged on the vehicle right side part, and the oil pressure actuator 51 may be arranged on the vehicle left side part. That is, the slave cylinder 28 and the oil pressure valve unit 53 may be arranged on the opposite side of the oil pressure actuator 51 in the vehicle width direction.

The above embodiment is described using an example in which the under cowls 121L and 121R that cover a portion of the oil pressure actuator 51 and the oil pressure valve unit 53 from the outside are provided; however, the embodiment is not limited thereto. For example, an under cowl that covers all of the oil pressure actuator 51 and the oil pressure valve unit 53 from the outside may be provided. For example, the oil pressure actuator 51 and the oil pressure valve unit 53 may be covered by a cowl member other than the under cowl. That is, a cowl member that covers at least a portion of the oil pressure actuator 51 and the oil pressure valve unit 53 from the outside may be provided. On the other hand, a cowl member that covers at least a portion of the oil pressure actuator 51 and the oil pressure valve unit 53 from the outside may not be provided. That is, all of the oil pressure actuator 51 and the oil pressure valve unit 53 may be exposed to the outside.

The above embodiment is described using an example in which all of the oil pressure actuator 51 and the oil pressure valve unit 53 are arranged within the bank range B1 of the vehicle; however, the embodiment is not limited thereto. For example, at least a portion of the oil pressure actuator 51 and the oil pressure valve unit 53 may be arranged at the outside of the bank range B1 of the vehicle.

The above embodiment is described using an example in which the oil pressure actuator 51 and the oil pressure valve unit 53 are arranged in front of and below the engine 13; however, the embodiment is not limited thereto. For example, the arrangement position of the oil pressure actuator 51 and the oil pressure valve unit 53 may be suitably selected in accordance with the vehicle body structure such as an engine layout.

The above embodiment is described using an example in which a portion of the oil pressure actuator 51 and the oil pressure valve unit 53 is covered by the discharge pipes 131 to 134 from the front direction; however, the embodiment is not limited thereto. For example, all of the oil pressure actuator 51 and the oil pressure valve unit 53 may be covered by the discharge pipes 131 to 134 from the front direction. That is, at least a portion of the oil pressure actuator 51 and the oil pressure valve unit 53 may be covered by the discharge pipes 131 to 134 from the front direction. On the other hand, the oil pressure actuator 51 and the oil pressure valve unit 53 may not be covered by the discharge pipes 131 to 134 from the front direction. That is, all of the oil pressure actuator 51 and the oil pressure valve unit 53 may be exposed frontward.

The above embodiment is described using an example in which the master cylinder 60 and the motor 70 are arranged such that a longitudinal direction is directed in a vertical direction and are arranged to be inclined such that an upper end part is located at an outer position in the vehicle width direction, and a lower end part is located at an inner position in the vehicle width direction; however, the embodiment is not limited thereto. For example, the arrangement state of the master cylinder 60 and the motor 70 may be suitably selected in accordance with the vehicle body structure such as an engine layout.

The above embodiment is described using an example in which the oil pressure sensors 57 and 58 are arranged such that the longitudinal direction is directed in the vertical direction and are arranged to be inclined such that the upper end part is located at the outer position in the vehicle width direction, and the lower end part is located at the inner position in the vehicle width direction; however, the embodiment is not limited thereto. For example, the arrangement state of the oil pressure sensors 57 and 58 may be suitably selected in accordance with the vehicle body structure such as an engine layout.

The present invention is not limited to the embodiment described above. For example, the saddle-riding type vehicle includes all types of vehicles on which a driver rides the vehicle in a manner of straddling a vehicle body and includes not only a motorcycle (including a motorized bicycle and a scooter-type vehicle) but also a vehicle having three wheels (including a vehicle having two front wheels and one rear wheel in addition to a vehicle having one front wheel and two rear wheels). Further, the present invention is applicable to not only a motorcycle but also a vehicle having four wheels such as an automobile.

The configurations in the embodiment described above are examples of the present invention, and various changes such as replacing the constituent elements of the embodiment with known constituent elements can be made without departing from the scope of the present invention.

DESCRIPTION OF THE REFERENCE SYMBOLS

1 Motorcycle (saddle-riding type vehicle)
13 Engine
16 Cylinder
21 Transmission
26 Clutch
28 Slave cylinder
51 Oil pressure actuator
53 Oil pressure valve unit
57 Upstream-side oil pressure sensor (oil pressure sensor)
58 Downstream-side oil pressure sensor (oil pressure sensor)
60 Master cylinder
70 Motor
91 Master-side connection pipe arrangement
92 Slave-side connection pipe arrangement
121L Left under cowl (cowl member)
121R Right under cowl (cowl member)
131 First discharge pipe (discharge pipe)
132 Second discharge pipe (discharge pipe)
133 Third discharge pipe (discharge pipe)
134 Fourth discharge pipe (discharge pipe)
B1 Bank range

What is claimed is:

1. A saddle-riding type vehicle, comprising:
    a transmission that includes a clutch operated by an operation of a slave cylinder;
    an oil pressure actuator that includes a master cylinder which generates an oil pressure on an operation oil;
    an oil pressure valve unit that controls transmission of the oil pressure generated by the master cylinder to the slave cylinder;
    a master-side connection pipe arrangement that connects the master cylinder to the oil pressure valve unit;
    a slave-side connection pipe arrangement that connects the oil pressure valve unit to the slave cylinder;
    a left cowl member that covers a vehicle body left side part; and
    a right cowl member that covers a vehicle body right side part,
    wherein the slave cylinder and the oil pressure valve unit are arranged adjacent to one of the left cowl member and the right cowl member, and
    the oil pressure actuator is arranged adjacent to another one of the left cowl member and the right cowl member.

2. The saddle-riding type vehicle according to claim 1, wherein the clutch is arranged on the other side part in a vehicle width direction.

3. The saddle-riding type vehicle according to claim 1, wherein the oil pressure actuator and the oil pressure valve unit are arranged within a bank range of the saddle-riding type vehicle.

4. The saddle-riding type vehicle according to claim 1, further comprising:
    an engine arranged in front of the transmission,
    wherein the engine includes a cylinder that stands upward, and
    the oil pressure actuator and the oil pressure valve unit are arranged in front of and below the engine.

5. The saddle-riding type vehicle according to claim 4, further comprising:
    a discharge pipe that is connected to a front part of the cylinder,
    wherein at least part of the oil pressure actuator and the oil pressure valve unit is covered by the discharge pipe from a front direction.

6. The saddle-riding type vehicle according to claim 4, wherein the oil pressure actuator further comprises a motor for driving the master cylinder,
    wherein the master cylinder and the motor are arranged such that a longitudinal direction is directed in a vertical direction and are arranged to be inclined such that an upper end part is located at an outer position in a vehicle width direction, and a lower end part is located at an inner position in the vehicle width direction.

7. The saddle-riding type vehicle according to claim 4, wherein the oil pressure valve unit comprises an oil pressure sensor arranged such that a longitudinal direction is directed in a vertical direction and arranged to be inclined such that an upper end part is located at an outer position in a vehicle width direction, and a lower end part is located at an inner position in the vehicle width direction.

8. The saddle-riding type vehicle according to claim 1, further comprising:
    an engine arranged in front of the transmission,
    wherein at least a part of the engine is arranged between the oil pressure valve unit and the oil pressure actuator in a vehicle width direction.

9. The saddle-riding type vehicle according to claim 1, wherein an axis direction of the oil pressure valve unit intersects with a vehicle width direction, and
    an axis direction of the oil pressure actuator intersects with the vehicle width direction.

10. The saddle-riding type vehicle according to claim 1, wherein an axis direction of the oil pressure valve unit and an axis direction of the oil pressure actuator are arranged in non-parallel to each other.

* * * * *